(12) United States Patent
Smalley et al.

(10) Patent No.: US 7,338,915 B1
(45) Date of Patent: *Mar. 4, 2008

(54) ROPES OF SINGLE-WALL CARBON NANOTUBES AND COMPOSITIONS THEREOF

(75) Inventors: Richard E. Smalley, Houston, TX (US); Daniel T. Colbert, Houston, TX (US); Ting Guo, San Diego, CA (US); Andrew G. Rinzler, Houston, TX (US); Pavel Nikolaev, Houston, TX (US); Andreas Thess, Houston, TX (US)

(73) Assignee: Rice University, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/722,950

(22) Filed: Nov. 27, 2000

Related U.S. Application Data

(62) Division of application No. 08/687,665, filed on Jul. 26, 1996, now Pat. No. 6,183,714.

(60) Provisional application No. 60/016,313, filed on May 8, 1996, provisional application No. 60/003,449, filed on Sep. 8, 1995.

(51) Int. Cl.
*C01B 31/00* (2006.01)

(52) U.S. Cl. .................. 442/320; 442/349; 428/364; 428/903; 977/742; 977/743; 977/750; 977/842; 977/844; 423/447.2

(58) Field of Classification Search .......... 423/447.2; 442/320, 349; 428/364, 903; 977/742, 743, 977/750, 842, 844
See application file for complete search history.

(56) References Cited

U.S. PATENT DOCUMENTS

| 4,663,230 A | 5/1987 | Tennent |
| 5,165,909 A | 11/1992 | Tennent et al. |

(Continued)

FOREIGN PATENT DOCUMENTS

EP      0591595 A1      10/1992

(Continued)

OTHER PUBLICATIONS

"Large-scale purification of single-wall carbon nanotubes: process, product, and characterization", Appl. Phys, A 67, p. 29-37, 1998.*

(Continued)

*Primary Examiner*—Elizabeth M Cole
(74) *Attorney, Agent, or Firm*—Fish & Richardson P.C.; Ross Spencer Garsson (57) ABSTRACT

This invention provides a method of making single-wall carbon nanotubes by laser vaporizing a mixture of carbon and one or more Group VIII transition metals. Single-wall carbon nanotubes preferentially form in the vapor and the one or more Group VIII transition metals catalyzed growth of the single-wall carbon nanotubes. In one embodiment of the invention, one or more single-wall carbon nanotubes are fixed in a high temperature zone so that the one or more Group VIII transition metals catalyze further growth of the single-wall carbon nanotube that is maintained in the high temperature zone. In another embodiment, two separate laser pulses are utilized with the second pulse timed to be absorbed by the vapor created by the first pulse.

14 Claims, 7 Drawing Sheets

U.S. PATENT DOCUMENTS

| | | |
|---|---|---|
| 5,171,560 A | 12/1992 | Tennent |
| 5,227,038 A | 7/1993 | Smalley et al. |
| 5,300,023 A | 4/1994 | Lowery et al. |
| 5,300,203 A | 4/1994 | Smalley |
| 5,336,360 A | 8/1994 | Nordine |
| 5,338,571 A | 8/1994 | Mirkin et al. |
| 5,346,683 A | 9/1994 | Green et al. |
| 5,424,054 A | 6/1995 | Bethune et al. |
| 5,457,343 A | 10/1995 | Ajayan et al. |
| 5,500,200 A | 3/1996 | Mandeville et al. |
| 5,578,543 A | 11/1996 | Tennent et al. |
| 5,589,152 A | 12/1996 | Tennent et al. |
| 5,591,312 A | 1/1997 | Smalley |
| 5,698,175 A | 12/1997 | Hiura et al. |

FOREIGN PATENT DOCUMENTS

| | | | |
|---|---|---|---|
| WO | WO 98/07163 | | 8/1989 |
| WO | WO 96/18059 | | 6/1996 |
| WO | WO 96/38705 | | 12/1996 |
| WO | WO/97 09272 | * | 3/1997 |
| WO | WO 97/09272 | | 3/1997 |
| WO | WO 98/05920 | | 2/1998 |

OTHER PUBLICATIONS

"Collapse and Growth", Robert F. Curl, Nature, May 6, 1993, vol. 363, pp. 14-15.*

Ajayan et al., "Growth morphologies during cobalt catalyzed single-shell carbon nanotube synthesis," Chem. Phys. Lett., 215:509-517, 1993.

Bali, "The perfect nanotube," Nature, 382:207-208, 1996.

Bethune et al., "Cobalt catalyzed crowth of carbon nanotubes with single atomic layer walls," Nature, 363:605-607, 1993.

Chai et al., "Fullerenes with metal inside," J. Phys. Chem., 95(20):7564-7568, 1991.

Dai et al., "Single-wall nanotubes produced by metal-catalyzed disproportionation of carbon monoxide," Chem. Phys. Lett. 260:471-475, 1996.

Dai et al., "Nanotubes as nanotubes in scanning probe microscopy", Nature, 384:147-150, 1996.

Dresselhaus et al., Science of Fullerness and Carbon Nanotubes, Academic Press, San Diego, California, Chapter 19, pp. 756-760, 1996.

Ebbesen et al., "Carbon nanotubes," Annual Review of Materials Science, 24:235-264, 1994.

Ebbesen et al., "Large-scale synthesis of carbon nanotubes," Nature, 358:220-222, 1992.

Ge et al., "Scanning tunneling microscopy of single-shell nanotubes of carbon," Applied Physics Letters, 65(18):2284-2286, 1994.

Guo et al., "Catalytic growth of single-walled nanotubes by laser vaporization;" Chemical Physics Letters, 243(1-2):49-54, 1995.

Guo et al., "Production of single-walled carbon nanotubes via laser vaporization technique," Proc. Symp. Recent Adv. Chem. Phys. Fullerenes & Rel. Mater., Proc. Fullerenes Chem., Phys. New Directions VII, Reno, NV, May 16-21, Electrochem. Soc.

Guo et al., "Self-assembly of tubular fullernes," J. Phys. Chem., 99:10694-10697, 1995.

Haufler et al., "Carbon arc generation of C60," Mat. Res. Soc. Symp. Proc., 206:627-637, 1991.

Hiura et al., "Opening and purification of carbon nanotubes in high yields," Advanced Materials, 7(3):275-276, 1995.

Hwang et al., "Well-aligned carbon nanotubes", Advanced Materials, 5(9):643-646, 1993.

Iijima et al., "Helical microtubules of graphitic carbon," Nature, 354:56-58, 1991.

Iijima et al., "Single-Shell Carbon Nanotubes of 1-nm Diameter," Nature, 363(6430):603-605, 1993.

Journet et al., "Large scaled production of single-wall carbon nanotube tubes by electric arc technique," Nature, 388:756-758, 1997.

Lambert et al., "Improving conditions toward isolating single-shell carbon nanotubes," Chem. Phys. Lett., 226:364-371, 1994.

Saito et al., "Carbon nanocapsules encaging metals and carbides," J. Phys. Chem. Solids, 54:1849-1860, 1993.

Saito et al., "Extrusion of single-wall carbon nanotubes via formation of small particles condensed near an evaporation source," Chem. Phys. Lett., 236:419-426, 1995.

Seraphin et al., "Single-walled tubes and encapsulation of nanocrystals into carbon clusters," Electrochem. Soc., 142:290-297, 1995.

Thess et al., "Crystalline ropes of metallic carbon nanotubes," Science, 273(5274):483-487, 1996.

Toomasu et al., "Large quantity purification of carbon nanotubes and composite materials containing the purified carbon nanotubes", Chem. Abst., 123(2):233., Abstract No. 13038, 1995.

Venema et al., "Length control of individual carbon nanotubes by nanostructuring with a scanning tunneling microscope", Applied Physics Letters, 71(18):2629-2631, 1997.

Wang et al., "Stable glow discharge for synthesis of carbon nanotubes," Applied Physics Letters, 66(4):427-429, 1995.

Wilson et al., "Morphological modeling of atomic force microscopy imaging including nanostructure probes and fibrinogen molecules", J. Vac. Sci. Technol., B 14(4):2407-2416, 1996.

Yu Rongqing et al., "Purification and end-opening of carbon", Chemical Abstracts, 125(4):25-26, Abstract No. 210969, 1996.

Zhou et al., "Single-Walled Carbon Nanotubes Growing Radially From $YC_2$ Particles," Applied Physics Letters, 65(12):1593-1595, 1994.

* cited by examiner

ROPES OF SINGLE-WALL CARBON NANOTUBES AND COMPOSITIONS THEREOF

CROSS REFERENCE TO RELATED APPLICATIONS

This application is a divisional of U.S. patent application Ser. No. 08/687,665 filed Jul. 26, 1996 (now U.S. Pat. No. 6,183,714 issued Feb. 6, 2001) which claims benefit of U.S. provisional patent application Ser. No. 60/003,449 filed Sep. 8, 1995 and Ser. No. 60/016,313 filed May 8, 1996.

SUMMARY OF THE INVENTION

The invention provides a method of making single-wall carbon nanotubes by condensing carbon vapor at appropriate conditions around the "live end" of a carbon nanotube, preferably a single-wall carbon nanotube. A single-wall carbon nanotube with a live end is formed by vaporizing carbon along with appropriate amounts of a Group VIII transition metal or mixtures of two or more Group VIII transition metals, maintaining the vapor at the proper annealing conditions and then collecting the soot and/or other material that condenses from the carbon/metal vapor. In one embodiment of the invention, direct laser vaporization of a composite rod formed from a mixture of graphite and one or more Group VIII transition metals produced single-wall carbon nanotubes when the transition-metal/graphite vapor was briefly maintained in a heated tube. In another embodiment of the invention, the composite rod was vaporized by utilizing two different laser pulses spaced apart in time to provide a more uniform and effective vaporization of the composite rod.

The invention also provides a method of making ropes of single-wall carbon nanotubes. These ropes comprise about 100 to 500 single-wall carbon nanotubes all roughly parallel to each other arranged in a two-dimensional ("2-D") triangular lattice having a lattice constant of about 17 Angstroms (Å). Single-wall carbon nanotubes in a rope have a diameter of 13.8 Å±0.3 Å, or about 13.8 Å±0.2 Å, and are predominant over other possible sizes of single-wall carbon nanotubes. The invention comprises the methods of making single-wall carbon nanotubes and ropes of single-wall carbon nanotubes disclosed herein, as well as the products and compositions produced by those processes.

For example, a 1:1 atom mixture of cobalt and nickel was combined in an amount of 1 to 3% on an atom ratio with graphite (97 to 99 atom % carbon) and heated and pressed to form a composite rod. Portions of that transition-metal/graphite composite rod were vaporized with a laser inside a tube maintained at a temperature of about 1000° to 1300° C. A flowing stream of argon gas was passed through the tube and the pressure in the tube maintained at about 500 Torr. Material from one end of the graphite/transition-metal composite rod was vaporized with a laser to form a vapor comprising carbon, cobalt and nickel. The soot collected from that vapor produced single-wall carbon nanotubes in concentrations much greater than observed before. About 50% or more of all of the carbon in the deposits of product collected downstream of the composite rod were single-wall carbon nanotubes present either as individual nanotubes or as ropes of nanotubes. Other combinations of two or more Group VIII transition metals as well as any Group VIII transition metal used singularly will produce the single-wall carbon nanotubes in the method of this invention, at concentrations of 0.1 to 10 atom %. Preferably, one or more Group VIII transition metals selected from the group of ruthenium, cobalt, nickel and platinum are used.

The invention also includes an embodiment where carbon nanotubes having a live end, preferably single-wall carbon nanotubes, are caught and maintained in the heated portion of the tube (annealing zone). A tungsten wire or mesh grid may be mounted in the tube downstream of the target to catch some of the carbon nanotubes formed from vaporization of the target comprising carbon and one or more Group VIII transition metals. After the carbon nanotube having a live end is caught, the carbon vapor supplied to the live end of the carbon nanotube may be supplied by: (i) continued laser vaporization of the target comprising carbon and one or more Group VIII transition metals; (ii) stopping laser vaporization of the target comprising carbon and one or more Group VIII transition metals and starting laser vaporization of a target comprising, consisting essentially of or consisting of carbon, (iii) stopping laser vaporization altogether and introducing carbon to the live end of the carbon nanotube from some other source. Step (iii) may be accomplished, for example, by adding graphite particles, fullerene particles, carbon vapor, carbon monoxide (CO), or hydrocarbons to the argon gas flowing past the live end of the carbon nanotube or by flowing CO or a hydrocarbon gas (without using an inert gas) past the live end of the carbon nanotube. In this embodiment, after the carbon nanotubes having at least one live end are formed, the oven temperature (annealing zone temperature) may be reduced. The temperature range may be 400° to 1500° C., most preferably 500° to 700° C. Other features of the invention will be apparent from the following Description of the Several Views of the Drawings and Detailed Description of the Invention.

DETAILED DESCRIPTION OF THE INVENTION

It is known that fullerene tubes are produced in some circumstances along with the production of fullerenes from vaporized carbon. Ebbesen et al. (Ebbesen I), "Large-Scale Synthesis Of Carbon Nanotubes," *Nature*, Vol. 358, p. 220 (Jul. 16, 1992) and Ebbesen et al., (Ebbesen II), "Carbon Nanotubes," *Annual Review of Materials Science*, Vol. 24, p. 235 (1994). Such tubes are referred to herein as carbon nanotubes. Many of the carbon nanotubes examined early on had multiple walls, i.e., the carbon nanotubes resembled concentric cylinders having a small cylinder in the middle immediately surrounded by a larger cylinder that in turn was immediately surrounded by an even larger cylinder. Each cylinder represented a "wall" of the carbon nanotube. In theory, there is no limit to the number of walls possible on a carbon nanotube, and carbon nanotubes having up to seven walls have been recognized in the prior art. Ebbesen II; Iijima et al., "Helical Microtubules Of Graphitic Carbon," *Nature*, Vol. 354, p. 56 (Nov. 7, 1991).

Multi-wall carbon nanotubes have been discovered in carbon deposits on carbon electrodes that have been used in carbon arc methods of making fullerenes. Ebbesen I; Ebbesen II. It is also known that single-wall carbon nanotubes can be made by adding a specific metal or a mixture of specific metals to the carbon in one or both of the carbon electrodes used in a carbon arc apparatus for making fullerenes. See Iijima et al., "Single-Shell Carbon Nanotubes of 1 nm Diameter," *Nature*, Vol. 363, p. 603 (1993); and Bethune et al., "Cobalt Catalyzed Growth of Carbon Nanotubes with Single Atomic Layer Walls," *Nature*, Vol. 363, p. 605 (1993). The prior art recognized a method of making single-wall carbon nanotubes using a DC arc discharge apparatus previously known to be useful in making fullerenes described by U.S. Pat. No. 5,227,038. Single-wall carbon nanotubes were made using the DC arc discharge apparatus by simultaneously evaporating carbon and a small percentage of Group VIII transition metal from the anode of the arc discharge apparatus. See Iijima et al., "Single-Shell Carbon Nanotubes of 1 nm Diameter," *Nature*, Vol. 363, p. 603 (1993); Bethune et al., "Cobalt Catalyzed Growth of Carbon Nanotubes with Single Atomic Layer Walls," *Nature*, Vol. 63, p. 605 (1993); Ajayan et al., "Growth Morphologies During Cobalt Catalyzed Single-Shell Carbon Nanotube Synthesis," *Chem. Phys. Lett.*, Vol. 215, p. 509 (1993); Zhou et al., "Single-Walled Carbon Nanotubes Growing Radially From $YC_2$ Particles," *Appl. Phys. Lett.*, Vol. 65, p. 1593 (1994); Seraphin et al., "Single-Walled Tubes and Encapsulation of Nanocrystals Into Carbon Clusters," *Electrochem. Soc.*, Vol. 142, p. 290 (1995); Saito et al., "Carbon Nanocapsules Encaging Metals and Carbides," *J. Phys. Chem. Solids*, Vol. 54, p. 1849 (1993); Saito et al., "Extrusion of Single-Wall Carbon Nanotubes Via Formation of Small Particles Condensed Near an Evaporation Source," *Chem. Phys. Lett.*, Vol. 236, p. 419 (1995). It is also known that mixtures of such metals can significantly enhance the yield of single-wall carbon nanotubes in the arc discharge apparatus. See Lambert et al., "Improving Conditions Toward Isolating Single-Shell Carbon Nanotubes," *Chem. Phys. Lett.*, Vol. 226, p. 364 (1994).

Single-wall carbon nanotubes of this invention are much more likely to be free of defects than multi-wall carbon nanotubes. Defects in single-wall carbon nanotubes are less likely than defects in multi-walled carbon nanotubes because the latter can survive occasional defects, while the former have no neighboring walls to compensate for defects by forming bridges between unsaturated carbon valances. Since single-wall carbon nanotubes will have fewer defects, they are stronger, more conductive, and therefore more useful than multi-wall carbon nanotubes of similar diameter.

Carbon nanotubes, and in particular the single-wall carbon nanotubes of this invention, are useful for making electrical connectors in micro devices such as integrated circuits or in semiconductor chips used in computers because of the electrical conductivity and small size of the carbon nanotube. The carbon nanotubes are useful as antennas at optical frequencies, and as probes for scanning probe microscopy such as are used in scanning tunneling microscopes (STM) and atomic force microscopes (AFM). The carbon nanotubes are also useful as strengthening agents in any composite material that may be strengthened or combined with other forms of carbon such as graphite or carbon black. The carbon nanotubes may be used in place of or in conjunction with carbon black in tires for motor vehicles. The carbon nanotubes are useful in place of or in conjunction with graphite fibers in any application using graphite fibers including airplane wings and shafts for golf clubs and fishing rods. The carbon nanotubes may also be used in combination with moldable polymers that can be formed into shapes, sheets or films, as is well known in the polymer art, to strengthen the shape, sheet or film and/or to make electrically conductive shapes, sheets or films. The carbon nanotubes are also useful as supports for catalysts used in industrial and chemical processes such as hydrogenation, reforming and cracking catalysts.

Ropes of single-wall carbon nanotubes made by this invention are metallic, i.e., they will conduct electrical charges with a relatively low resistance. Ropes are useful in any application where an electrical conductor is needed, for example as an additive in electrically conductive points or in polymer coatings or as the probing tip of an STM or AFM.

In defining carbon nanotubes, it is helpful to use a recognized system of nomenclature. In this application, the carbon nanotube nomenclature described by M. S. Dresselhaus, G. Dresselhaus, and P. C. Eklund, *Science of Fullerenes and Carbon Nanotubes*, Chap. 19, especially pp. 756-760, (1996), published by Academic Press, 525 B Street, Suite 1900, San Diego, Calif. 92101-4495 or 6277 Sea Harbor Drive, Orlando, Fla. 32877 (ISBN 0-12-221820-5), which is hereby incorporated by reference, will be used. The single wall tubular fullerenes are distinguished from each other by double index (n,m) where n and m are integers that describe how to cut a single strip of hexagonal "chickenwire" graphite so that its edges join seamlessly when it is wrapped onto the surface of a cylinder. The dual laser pulse feature described herein produces an abundance of (10,10) single-wall carbon nanotubes. The (10, 10) tubes are known as "armchair" tubes. When the two indices are the same m=n the resultant tube is said to be of the "arm-chair" (or n,n) type since when the tube is cut perpendicular to the tube axis, only the sides of the hexagons are exposed and their pattern around the periphery of the tube edge resembles the arm and seat of an arm chair repeated n times. All armchair tubes are metallic. Other armchair tubes are denoted as (n, n) where n is an integer from 1 to infinity, preferably 1 to 1000 more preferably 5 to 500. The (10,10), single-wall carbon nanotubes have an approximate tube diameter of 13.8 Å±0.3 Å or 13.8 Å±0.2 Å.

The present invention provides a method for making single-wall carbon nanotubes in which a laser beam vaporizes material from a target comprising, consisting essentially of, or consisting of a mixture of carbon and one or more Group VIII transition metals. The vapor from the target forms carbon nanotubes that are predominantly single-wall carbon nanotubes, and of those, the (10, 10) tube is predominant. The method also produces significant amounts of single-wall carbon nanotubes that are arranged as ropes, i.e., the single-wall carbon nanotubes run parallel to each other as shown by FIGS. 2A-2E. Again, the (10, 10) tube is the predominant tube found in each rope. The laser vaporization method provides several advantages over the arc discharge method of making carbon nanotubes: laser vaporization allows much greater control over the conditions favoring growth of single-wall carbon nanotubes, the laser vaporization method permits continuous operation, and the laser vaporization method produces single-wall carbon nanotubes in higher yield and of better quality. As described herein, the laser vaporization method may also be used to produce longer carbon nanotubes and longer ropes.

Carbon nanotubes may have diameters ranging from about 1 nanometer (nm) for a single-wall carbon nanotube up to 3 nm, 5 nm, 10 nm, 30 nm, 60 nm or 100 nm for single-wall or multi-wall carbon nanotubes. The carbon nanotubes may range in length from 50 nm up to 1 millimeter (mm), 1 centimeter (cm), 3 cm, 5 cm, or greater. The yield of single-wall carbon nanotubes in the product made by this invention is unusually high. Yields of single-wall carbon nanotubes greater than 10 wt %, greater than 30 wt % and greater than 50 wt % of the material vaporized are possible with this invention.

As will be described further, the one or more Group VIII transition metals catalyze the growth in length of a carbon nanotube and/or the ropes. The one or more Group VIII transition metals also selectively produce single-wall carbon nanotubes and ropes of single-wall carbon nanotubes in high yield. The mechanism by which the growth in the carbon nanotube and/or rope is accomplished is not completely understood. However, it appears that the presence of the one or more Group VIII transition metals on the end of the carbon nanotube facilitates the addition of carbon from the carbon vapor to the solid structure that forms the carbon nanotube. Applicants believe this mechanism is responsible for the high yield and selectivity of single-wall carbon nanotubes and/or ropes in the product and will describe the invention utilizing this mechanism as merely an explanation of the results of the invention. Even if the mechanism is proved partially or wholly incorrect, the invention which achieves these results is still fully described herein.

One aspect of the invention comprises a method of making carbon nanotubes and/or ropes of carbon nanotubes which comprises supplying carbon vapor to the live end of a carbon nanotube while maintaining the live end of a carbon nanotube in an annealing zone. Carbon can be vaporized in accordance with this invention by an apparatus in which a laser beam impinges on a target comprising carbon that is maintained in a heated zone. A similar apparatus has been described in the literature, for example, in U.S. Pat. No. 5,300,203 which is incorporated herein by reference, and in Chai, et al., "Fullerenes with Metals Inside," *J. Phys. Chem.*, vol. 95, no. 20, p. 7564 (1991).

Carbon nanotubes having at least one live end are formed when the target also comprises a Group VIII transition metal or mixtures of two or more Group VIII transition metals. In this application, the term "live end" of a carbon nanotube refers to the end of the carbon nanotube on which atoms of the one or more Group VIII transition metals are located. One or both ends of the nanotube may be a live end. A carbon nanotube having a live end is initially produced in the laser vaporization apparatus of this invention by using a laser beam to vaporize material from a target comprising carbon and one or more Group VIII transition metals and then introducing the carbon/Group VIII transition metal vapor to an annealing zone. Optionally, a second laser beam is used to assist in vaporizing carbon from the target. A carbon nanotube having a live end will form in the annealing zone and then grow in length by the catalytic addition of carbon from the vapor to the live end of the carbon nanotube. Additional carbon vapor is then supplied to the live end of a carbon nanotube to increase the length of the carbon nanotube.

The carbon nanotube that is formed is not always a single-wall carbon nanotube; it may be a multi-wall carbon nanotubes having two, five, ten or any greater number of walls (concentric carbon nanotubes). Preferably, though, the carbon nanotube is a single-wall carbon nanotube and this invention provides a way of selectively producing (10, 10) single-wall carbon nanotubes in greater and sometimes far greater abundance than multi-wall carbon nanotubes.

The annealing zone where the live end of the carbon nanotube is initially formed should be maintained at a temperature of 500° to 1500° C., more preferably 1000° to 1400° C. and most preferably 1100 to 1300° C. In embodiments of this invention where carbon nanotubes having live ends are caught and maintained in an annealing zone and grown in length by further addition of carbon (without the necessity of adding further Group VIII transition metal vapor), the annealing zone may be cooler, 400° to 1500° C., preferably 400° to 1200° C., most preferably 5000 to 700° C. The pressure in the annealing zone should be maintained in the range of 50 to 2000 Torr., more preferably 100 to 800 Torr. and most preferably 300 to 600 Torr. The atmosphere in the annealing zone will comprise carbon. Normally, the atmosphere in the annealing zone will also comprise a gas that sweeps the carbon vapor through the annealing zone to a collection zone. Any gas that does not prevent the formation of carbon nanotubes will work as the sweep gas, but preferably the sweep gas is an inert gas such as helium, neon, argon, krypton, xenon, radon, or mixtures of two or more of these. Helium and Argon are most preferred. The use of a flowing inert gas provides the ability to control temperature, and more importantly, provides the ability to transport carbon to the live end of the carbon nanotube. In some embodiments of the invention, when other materials are being vaporized along with carbon, for example one or more Group VIII transition metals, those compounds and vapors of those compounds will also be present in the atmosphere of the annealing zone. If a pure metal is used, the resulting vapor will comprise the metal. If a metal oxide is used, the resulting vapor will comprise the metal and ions or molecules of oxygen.

It is important to avoid the presence of too many materials that kill or significantly decrease the catalytic activity of the one or more Group VIII transition metals at the live end of the carbon nanotube. It is known that the presence of too much water ($H_2O$) and/or oxygen ($O_2$) will kill or significantly decrease the catalytic activity of the one or more Group VIII transition metals. Therefore, water and oxygen are preferably excluded from the atmosphere in the annealing zone. Ordinarily, the use of a sweep gas having less than 5 wt %, more preferably less than 1 wt % water and oxygen will be sufficient. Most preferably the water and oxygen will be less than 0.1 wt %.

Preferably, the formation of the carbon nanotube having a live end and the subsequent addition of carbon vapor to the carbon nanotube are all accomplished in the same apparatus. Preferably, the apparatus comprises a laser that is aimed at a target comprising carbon and one or more Group VIII transition metals, and the target and the annealing zone are maintained at the appropriate temperature, for example by maintaining the annealing zone in an oven. A laser beam may be aimed to impinge on a target comprising carbon and one or more Group VIII transition metals where the target is mounted inside a quartz tube that is in turn maintained within a furnace maintained at the appropriate temperature. As noted above, the oven temperature is most preferably within the range of 1100° to 1300° C. The tube need not necessarily be a quartz tube; it may be made from any material that can withstand the temperatures (1000° to 1500° C.). Alumina or tungsten could be used to make the tube in addition to quartz.

Improved results are obtained where a second laser is also aimed at the target and both lasers are timed to deliver pulses of laser energy at separate times. For example, the first laser may deliver a pulse intense enough to vaporize material from the surface of the target. Typically, the pulse from the first laser will last about 10 nanoseconds (ns). After the first pulse has stopped, a pulse from a second laser hits the target or the carbon vapor or plasma created by the first pulse to provide more uniform and continued vaporization of material from the surface of the target. The second laser pulse may be the same intensity as the first pulse, or less intense, but the pulse from the second laser is typically more intense than the pulse from the first laser, and typically delayed about 20 to 60 ns, more preferably 40 to 55 ns, after the end of the first pulse.

Examples of a typical specification for the first and second lasers are given in Examples 1 and 3 respectively. As a rough guide, the first laser may vary in wavelength from 11 to 0.1 micrometers, in energy from 0.05 to 1 Joule and in repetition frequency from 0.01 to 1000 Hertz (Hz). The duration of the first laser pulse may vary from $10^{-13}$ to $10^{-6}$ seconds (s). The second laser may vary in wavelength from 11 to 0.1 micrometers, in energy from 0.05 to 1 Joule and in repetition frequency from 0.01 to 1000 Hertz (Hz). The duration of the second laser pulse may vary from $10^{-13}$s to $10^{-6}$s. The beginning of the second laser pulse should be separated from end of the first laser pulse by about 10 to 100 ns. If the laser supplying the second pulse is an ultraviolet (UV) laser (an Excimer laser for example), the time delay can be longer, up to 1 to 10 milliseconds. But if the second pulse is from a visible or infrared (IR) laser, then the adsorption is preferably into the electrons in the plasma created by the first pulse. In this case, the optimum time delay between pulses is about 20 to 60 ns, more preferably 40 to 55 ns and most preferably 40 to 50 ns. These ranges on the first and second lasers are for beams focused to a spot on the target composite rod of about 0.3 to 10 mm diameter. The time delay between the first and second laser pulses is accomplished by computer control that is known in the art of utilizing pulsed lasers. Applicants have used a CAMAC crate from LeCroy Research Systems, 700 Chestnut Ridge Road, Chestnut Ridge, N.Y. 10977-6499 along with a timing pulse generator from Kinetics Systems Corporation, 11 Maryknoll Drive, Lockport, Ill. 60441 and a nanopulser from LeCroy Research Systems. Multiple first lasers and multiple second lasers may be needed for scale up to larger targets or more powerful lasers may be used. The main feature of multiple lasers is that the first laser should evenly ablate material from the target surface into a vapor or plasma and the second laser should deposit enough energy into the ablated material in the vapor or plasma plume made by the first pulse to insure that the material is vaporized into atoms or small molecules (less than ten carbon atoms per molecule). If the second laser pulse arrives too soon after the first pulse, the plasma created by the first pulse may be so dense that the second laser pulse is reflected by the plasma. If the second laser pulse arrives too late after the first pulse, the plasma and/or ablated material created by the first laser pulse will strike the surface of the target. But if the second laser pulse is timed to arrive just after the plasma and/or ablated material has been formed, as described herein, then the plasma and/or ablated material will absorb energy from the second laser pulse. Also, it should be noted that the sequence of a first laser pulse followed by a second laser pulse will be repeated at the same repetition frequency as the first and second laser pulses, i.e., 0.01 to 1000 Hz.

In addition to lasers described in the Examples, other examples of lasers useful in this invention include an XeF (365 nm wavelength) laser, an XeCl (308 nm wavelength) laser, a KrF (248 nm wavelength) laser or an ArF (193 nm wavelength) laser.

Optionally but preferably a sweep gas is introduced to the tube upstream of the target and flows past the target carrying vapor from the target downstream. The quartz tube should be maintained at conditions so that the carbon vapor and the one or more Group VIII transition metals will form carbon nanotubes at a point downstream of the carbon target but still within the heated portion of the quartz tube. Collection of the carbon nanotubes that form in the annealing zone may be facilitated by maintaining a cooled collector in the internal portion of the far downstream end of the quartz tube. For example, carbon nanotubes may be collected on a water cooled metal structure mounted in the center of the quartz tube. The carbon nanotubes will collect where the conditions are appropriate, preferably on the water cooled collector.

Any Group VIII transition metal may be used as the one or more Group VIII transition metals in this invention. Group VIII transition metals are iron (Fe), cobalt (Co), nickel (Ni), ruthenium (Ru), rhodium (Rh), palladium (Pd), osmium (Os), Iridium (Ir) and platinum (Pt). Preferably, the one or more Group VIII transition metals are selected from the group consisting of iron, cobalt, ruthenium, nickel and platinum. Most preferably, mixtures of cobalt and nickel or mixtures of cobalt and platinum are used. The one or more Group VIII transition metals useful in this invention may be used as pure metal, oxides of metals, carbides of metals, nitrate salts of metals, or other compounds containing the Group VIII transition metal. Preferably, the one or more Group VIM transition metals are used as pure metals, oxides of metals, or nitrate salts of metals. The amount of the one or more Group VIII transition metals that should be combined with carbon to facilitate production of carbon nanotubes having a live end, is from 0.1 to 10 atom percent, more preferably 0.5 to 5 atom percent and most preferably 0.5 to 1.5 atom percent. In this application, atom percent means the percentage of specified atoms in relation to the total number of atoms present. For example, a 1 atom % mixture of nickel and carbon means that of the total number of atoms of nickel plus carbon, 1% are nickel (and the other 99% are carbon). When mixtures of two or more Group VIII transition metals are used, each metal should be 1 to 99 atom % of the metal mix, preferably 10 to 90 atom % of the metal mix and most preferably 20 to 80 atom % of the metal mix. When two Group VIII transition metals are used, each metal is most preferably 30 to 70 atom % of the metal mix. When three Group VIII transition metals are used, each metal is most preferably 20 to 40 atom % of the metal mix.

The one or more Group VIII transition metals should be combined with carbon to form a target for vaporization by a laser as described herein. The remainder of the target should be carbon and may include carbon in the graphitic form, carbon in the fullerene form, carbon in the diamond form, or carbon in compound form such as polymers or hydrocarbons, or mixtures of two or more of these. Most preferably, the carbon used to make the target is graphite.

Carbon is mixed with the one or more Group VIII transition metals in the ratios specified and then, in the laser vaporization method, combined to form a target that comprises the carbon and the one or more Group VIII transition metals. The target may be made by uniformly mixing carbon and the one or more Group VIII transition metals with carbon cement at room temperature and then placing the mixture in a mold. The mixture in the mold is then compressed and heated to about 130° C. for about 4 or 5 hours while the epoxy resin of the carbon cement cures. The compression pressure used should be sufficient to compress the mixture of graphite, one or more Group VIII transition metals and carbon cement into a molded form that does not have voids so that the molded form will maintain structural integrity. The molded form is then carbonized by slowly heating it to a temperature of 810° C. for about 8 hours under an atmosphere of flowing argon. The molded and carbonized targets are then heated to about 1200° C. under flowing argon for about 12 hours prior to their use as a target to generate a vapor comprising carbon and the one or more Group VIII transition metals.

Figure 1:
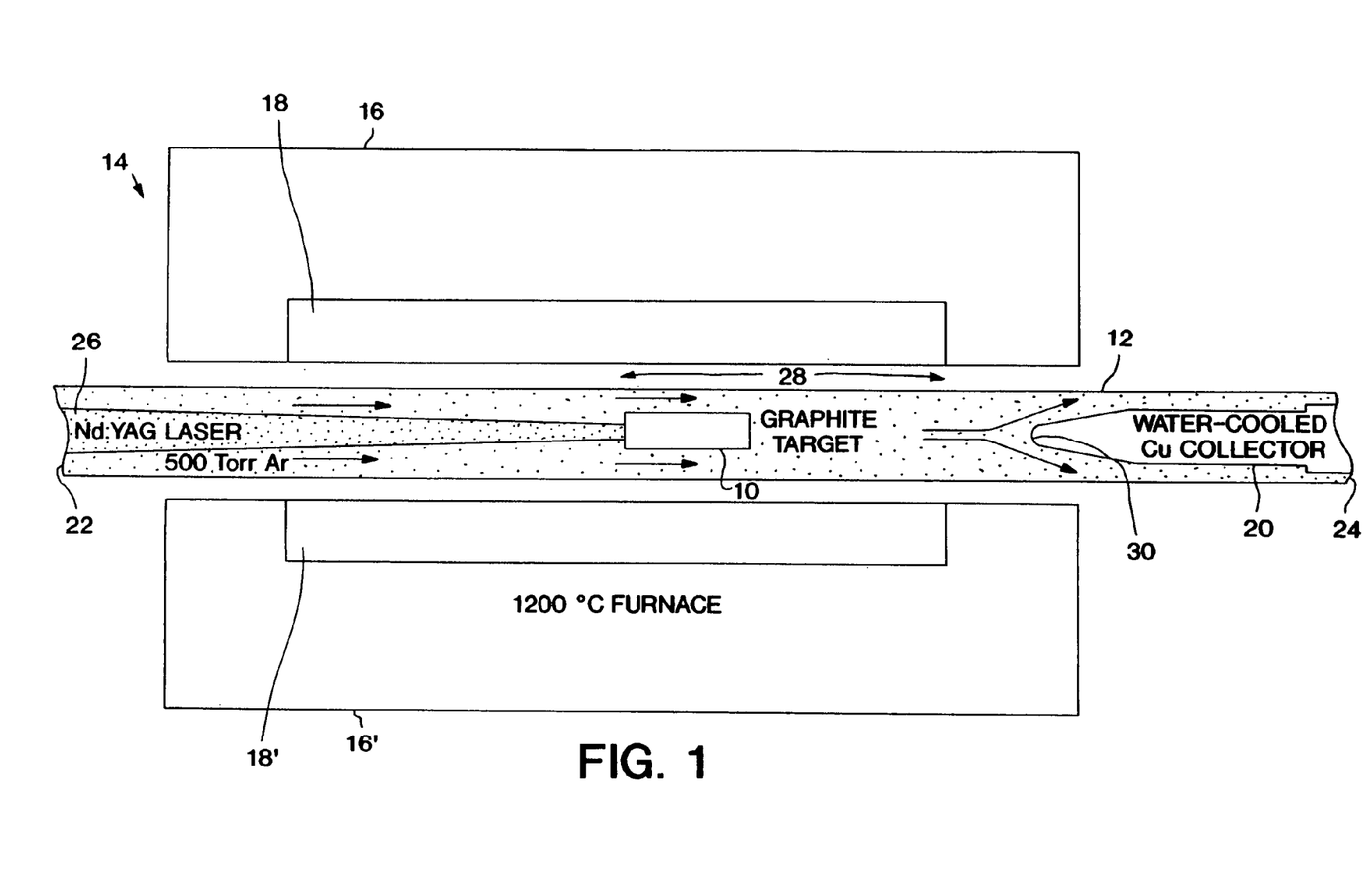
FIG. 1 is a diagram of an apparatus for practicing the invention.

The invention may be further understood by reference to FIG. 1 which is a cross-section view of laser vaporization in an oven. A target 10 is positioned within tube 12. The target 10 will comprise carbon and may comprise one or more Group VIII transition metals. Tube 12 is positioned in oven 14 which comprises insulation 16 and heating element zone 18. Corresponding portions of oven 14 are represented by insulation 16' and heating element zone 18'. Tube 12 is positioned in oven 14 so that target 10 is within heating element zone 18.

FIG. 1 also shows water cooled collector 20 mounted inside tube 12 at the downstream end 24 of tube 12. An inert gas such as argon or helium may be introduced to the upstream end 22 of tube 12 so that flow is from the upstream end 22 of tube 12 to the downstream end 24. A laser beam 26 is produced by a laser (not shown) focused on target 10. In operation, oven 14 is heated to the desired temperature, preferably 1100° to 1300° C., usually about 1200° C. Argon is introduced to the upstream end 22 as a sweep gas. The argon may optionally be preheated to a desired temperature, which should be about the same as the temperature of oven 14. Laser beam 26 strikes target 10 vaporizing material in target 10. Vapor from target 10 is carried toward the downstream end 24 by the flowing argon stream. If the target is comprised solely of carbon, the vapor formed will be a carbon vapor. If one or more Group VIII transition metals are included as part of the target, the vapor will comprise carbon and one or more Group VIII transition metals.

The heat from the oven and the flowing argon maintain a certain zone within the inside of the tube as an annealing zone. The volume within tube 12 in the section marked 28 in FIG. 1 is the annealing zone wherein carbon vapor begins to condense and then actually condenses to form carbon nanotubes. The water cooled collector 20 may be maintained at a temperature of 700° C. or lower, preferably 500° C. or lower on the surface to collect carbon nanotubes that were formed in the annealing zone.

In one embodiment of the invention, carbon nanotubes having a live end can be caught or mounted on a tungsten wire in the annealing zone portion of tube 12. In this embodiment, it is not necessary to continue to produce a vapor having one or more Group VIII transition metals. In this case, target 10 may be switched to a target that comprises carbon but not any Group VIII transition metal, and carbon will be added to the live end of the carbon nanotube.

In another embodiment of the invention, when the target comprises one or more Group VIII transition metals, the vapor formed by laser beam 26 will comprise carbon and the one or more Group VIII transition metals. That vapor will form carbon nanotubes in the annealing zone that will then be deposited on water cooled collector 20, preferably at tip 30 of water cooled collector 20. The presence of one or more Group VIII transition metals in the vapor along with carbon in the vapor preferentially forms carbon nanotubes instead of fullerenes, although some fullerenes and graphite will usually be formed as well. In the annealing zone, carbon from the vapor is selectively added to the live end of the carbon nanotubes due to the catalytic effect of the one or more Group VIII transition metals present at the live end of the carbon nanotubes.

Figure 3:
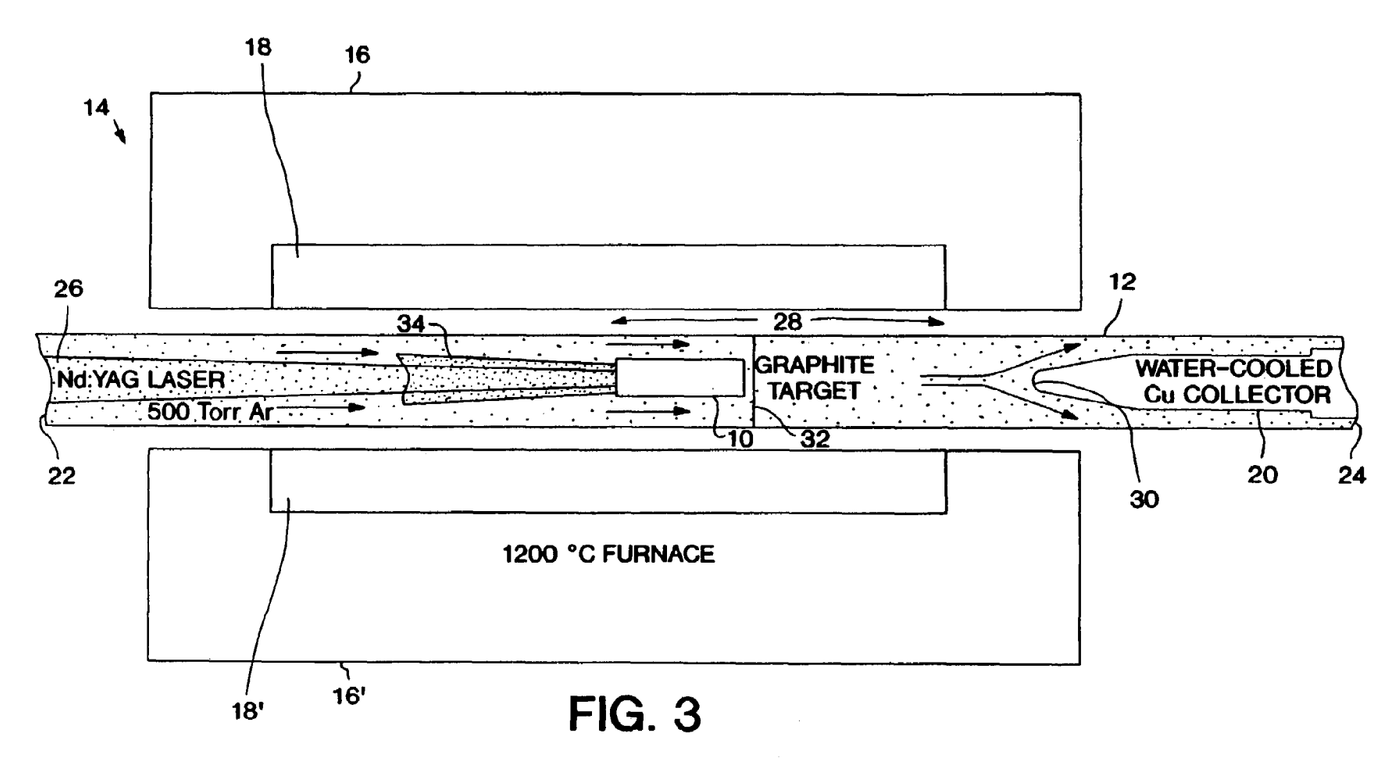
FIG. 3 is a diagram of an apparatus for practicing the invention utilizing two different laser pulses to vaporize the composite rod target.

FIG. 3 shows an optional embodiment of the invention that can be used to make longer carbon nanotubes wherein a tungsten wire 32 is stretched across the diameter of tube 12 downstream of target 10 but still within the annealing zone. After laser beam pulses hit the target 10 forming a carbon/Group VIII transition metal vapor, carbon nanotubes having live ends will form in the vapor. Some of those carbon nanotubes will be caught on the tungsten wire and the live end will be aimed toward the downstream end 24 of tube 12. Additional carbon vapor will make the carbon nanotube grow. Carbon nanotubes as long as the annealing zone of the apparatus can be made in this embodiment. In this embodiment, it is possible to switch to an all carbon target after initial formation of the carbon nanotubes having a live end, because the vapor need only contain carbon at that point.

FIG. 3 also shows part of second laser beam 34 as it impacts on target 10. In practice, laser beam 26 and second laser beam 34 would be aimed at the same surface of target 10, a but they would impact that surface at different times as described herein.

It is also possible to stop the laser or lasers altogether. Once the single-wall carbon nanotube having a live end is formed, the live end will catalyze growth of the single-wall carbon nanotube at lower temperatures and with other carbon sources. The carbon source can be switched to fullerenes, that can be transported to the live end by the flowing sweep gas. The carbon source can be graphite particles carried to the live end by the sweep gas. The carbon source can be a hydrocarbon that is carried to the live end by a sweep gas or a hydrocarbon gas or mixture of hydrocarbon gasses introduced to tube 12 to flow past the live end. Hydrocarbons useful include methane, ethane, propane, butane, ethylene, propylene, benzene, toluene or any other paraffinic, olefinic, cyclic or aromatic hydrocarbon, or any other hydrocarbon.

The annealing zone temperature in this embodiment can be lower than the annealing zone temperatures necessary to initially form the single-wall carbon nanotube having a live end. Annealing zone temperatures can be in the range of 400° to 1500° C., preferably 400 to 1200° C., most preferably 500° to 700° C. The lower temperatures are workable because the Group VIII transition metal(s) catalyze the addition of carbon to the nanotube at these lower temperatures.

The invention may also be understood by reference to the following examples.

EXAMPLE 1

The oven laser-vaporization apparatus described in FIG. 1 and also described by Haufler et al., "Carbon Arc Generation of $C_{60}$," *Mat. Res. Soc. Symp. Proc.*, Vol. 206, p. 627 (1991) and by U.S. Pat. No. 5,300,203 was utilized. An Nd:YAG laser was used to produce a scanning laser beam controlled by a motor-driven total reflector that was focused to a 6 to 7 mm diameter spot onto a metal-graphite composite target mounted in a quartz tube. The laser beam scans across the target's surface under computer control to maintain a smooth, uniform face on the target. The laser was set to deliver a 0.532 micron wavelength pulsed beam at 300 milliJoules per pulse. The pulse rate was 10 hertz and the pulse duration was 10 nanoseconds (ns).

The target was supported by graphite poles in a 1-inch quartz tube initially evacuated to 10 m Torr. and then filled with 500 Torr. argon flowing at 50 standard cubic centimeters per second (sccm). Given the diameter of the quartz tube, this volumetric flow results in a linear flow velocity through the quartz tube in the range of 0.5 to 10 cm/sec. The quartz tube was mounted in a high-temperature furnace with a maximum temperature setting of 1200° C. The high-temperature furnace used was a Lindberg furnace 12 inches long and was maintained at approximately 1000° to 1200° C. for the several experiments in Example 1. The laser vaporized material from the target and that vaporized material was swept by the flowing argon gas from the area of the target where it was vaporized and subsequently deposited onto a water-cooled collector, made from copper, that was positioned downstream just outside the furnace.

Targets were uniformly mixed composite rods made by the following three-step procedure: (i) the paste produced from mixing high-purity metals or metal oxides at the ratios given below with graphite powder supplied by Carbone of America and carbon cement supplied by Dylon at room temperature was placed in a 0.5 inch diameter cylindrical mold, (ii) the mold containing the paste was placed in a hydraulic press equipped with heating plates, supplied by Carvey, and baked at 130° C. for 4 to 5 hours under constant pressure, and (iii) the baked rod (formed from the cylindrical mold) was then cured at 810° C. for 8 hours under an atmosphere of flowing argon. For each test, fresh targets were heated at 1200° C. under flowing argon for varying lengths of time, typically 12 hours, and subsequent runs with the same targets proceeded after 2 additional hours heating at 1200° C.

The following metal concentrations were used in this example: cobalt (1.0 atom percent), copper (0.6 atom percent), niobium (0.6 atom percent), nickel (0.6 atom percent), platinum (0.2 atom percent), a mixture of cobalt and nickel (0.6 atom percent/0.6 atom percent respectively), a mixture of cobalt and platinum (0.6 atom percent/0.2 atom percent respectively), a mixture of cobalt and copper (0.6 atom percent/0.5 atom percent respectively), and a mixture of nickel and platinum (0.6 atom percent/0.2 atom percent respectively). The remainder of the mixture was primarily graphite along with small amounts of carbon cement. Each target was vaporized with a laser beam and the soots collected from the water cooled collector were then collected separately and processed by sonicating the soot for 1 hour in a solution of methanol at room temperature and pressure (other useful solvents include acetone, 1,2-dicholoroethane, 1-bromo, 1,2-dichloroethane, and N,N-dimethylformamide). With one exception, the products collected produced a homogeneous suspension after 30 to 60 minutes of sonication in methanol. One sample vaporized from a mixture of cobalt, nickel and graphite was a rubbery deposit having a small portion that did not fully disperse even after 2 hours of sonication in methanol. The soots were then examined using a transmission electron microscope with a beam energy of 100 keV (Model JEOL 2010).

Rods (0.5 inch diameter) having the Group VIII transition metal or mixture of two Group VIII transition metals described above were evaluated in the experimental apparatus to determine the yield and quality of single-wall carbon nanotubes produced. No multi-wall carbon nanotubes were observed in the reaction products. Yields always increased with increasing oven temperature up to the limit of the oven used (1200° C.). At 1200° C. oven temperature, of the single metals utilized in the example, nickel produced the greatest yield of single-wall carbon nanotubes followed by cobalt. Platinum yielded a small number of single-wall carbon nanotubes and no single-wall carbon nanotubes were observed when carbon was combined only with copper or only with niobium. With respect to the mixtures of two Group VIII transition metal catalysts with graphite, the cobalt/nickel mixture and the cobalt/platinum mixtures were both approximately equivalent and both were the best overall catalysts in terms of producing yields of single-wall carbon nanotubes. The yield of single-wall carbon nanotubes for both of these two metal mixtures were 10 to 100 times the yield observed when only one Group VIII transition metal was used. The mixture of nickel and platinum with graphite also had a higher yield of single-wall carbon nanotubes than a single metal alone. The cobalt/copper mixture with graphite produced a small quantity of single-wall carbon nanotubes.

The cobalt/nickel mixture with graphite and the cobalt/platinum mixture with graphite both produced deposits on the water cooled collector that resembled a sheet of rubbery material. The deposits were removed intact. The cobalt/platinum mixture produced single-wall carbon nanotubes in a yield estimated at 15 weight percent of all of the carbon vaporized from the target. The cobalt/nickel mixture produced single-wall carbon nanotubes at yields of over 50 wt % of the amount of carbon vaporized.

Figure 2A:
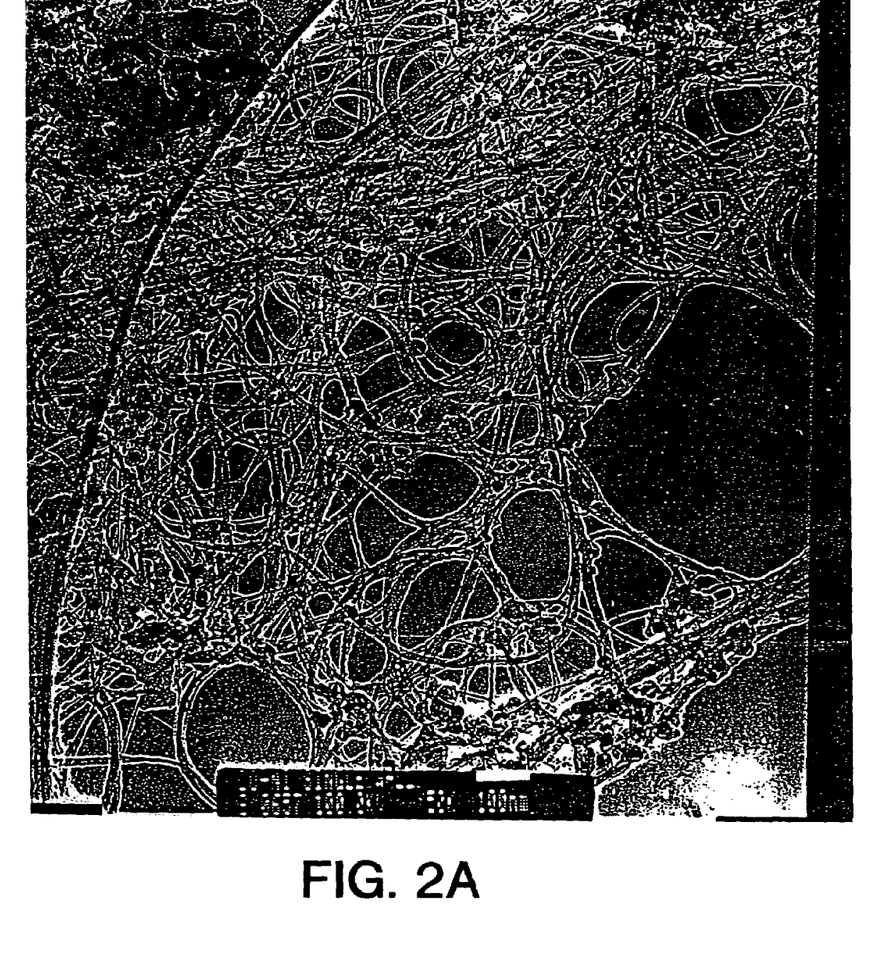
FIG. 2A is a medium-magnification transmission electron microscope image of single-wall nanotubes.
Figure 2B:
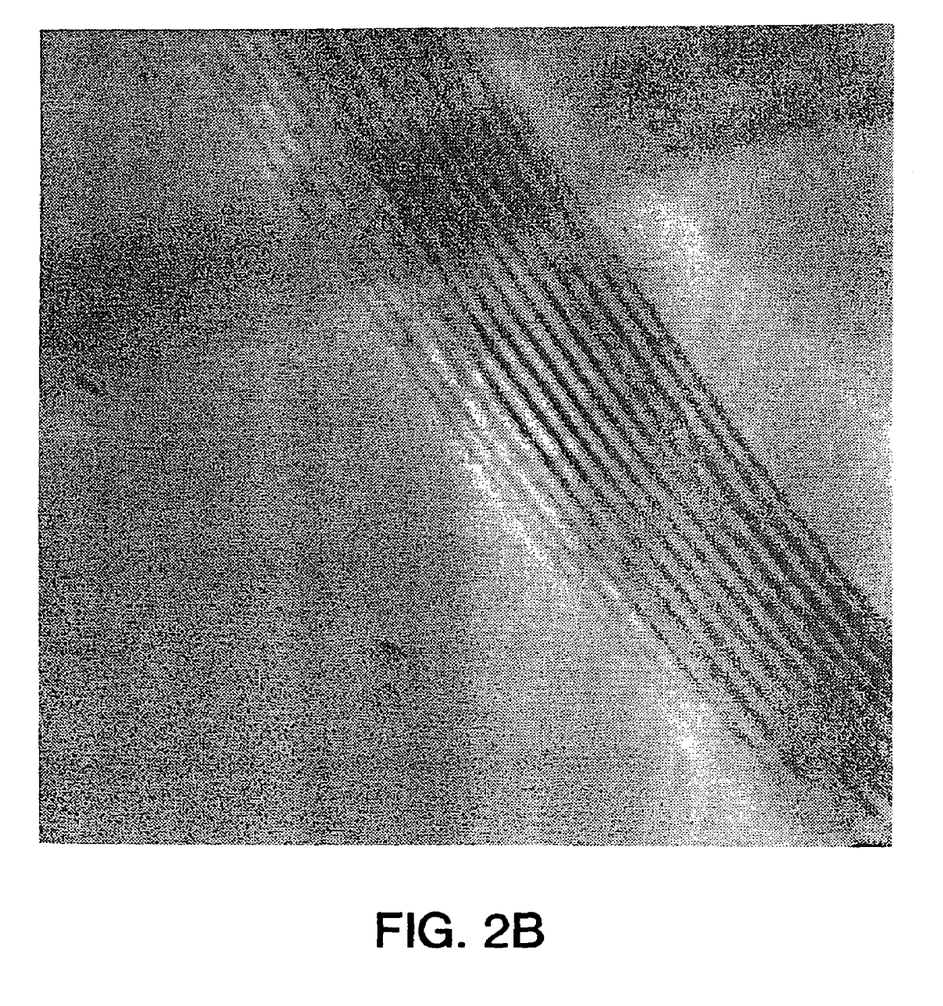
FIG. 2B is a high-magnification image of adjacent single-wall carbon nanotubes.

The images shown in FIGS. 2A through 2E are transmission electron micrographs of single-wall carbon nanotubes produced by vaporizing a target comprising graphite and a mixture of cobalt and nickel (0.6 atom percent/0.6 atom percent respectively) at an oven temperature of 1200° C. FIG. 2A shows a medium-magnification view (where the scale bar represents 100 mm) showing that almost everywhere, bundles of single-wall carbon nanotubes are tangled together with other single-wall carbon nanotubes. FIG. 2B is a high-magnification image of one bundle of multiple single-wall carbon nanotubes that are all roughly parallel to each other. The single-wall carbon nanotubes all have a diameter of about 1 nm, with similar spacing between adjacent single-wall carbon nanotubes. The single-wall carbon nanotubes adhere to one another by van der Waals forces.

Figure 2C:
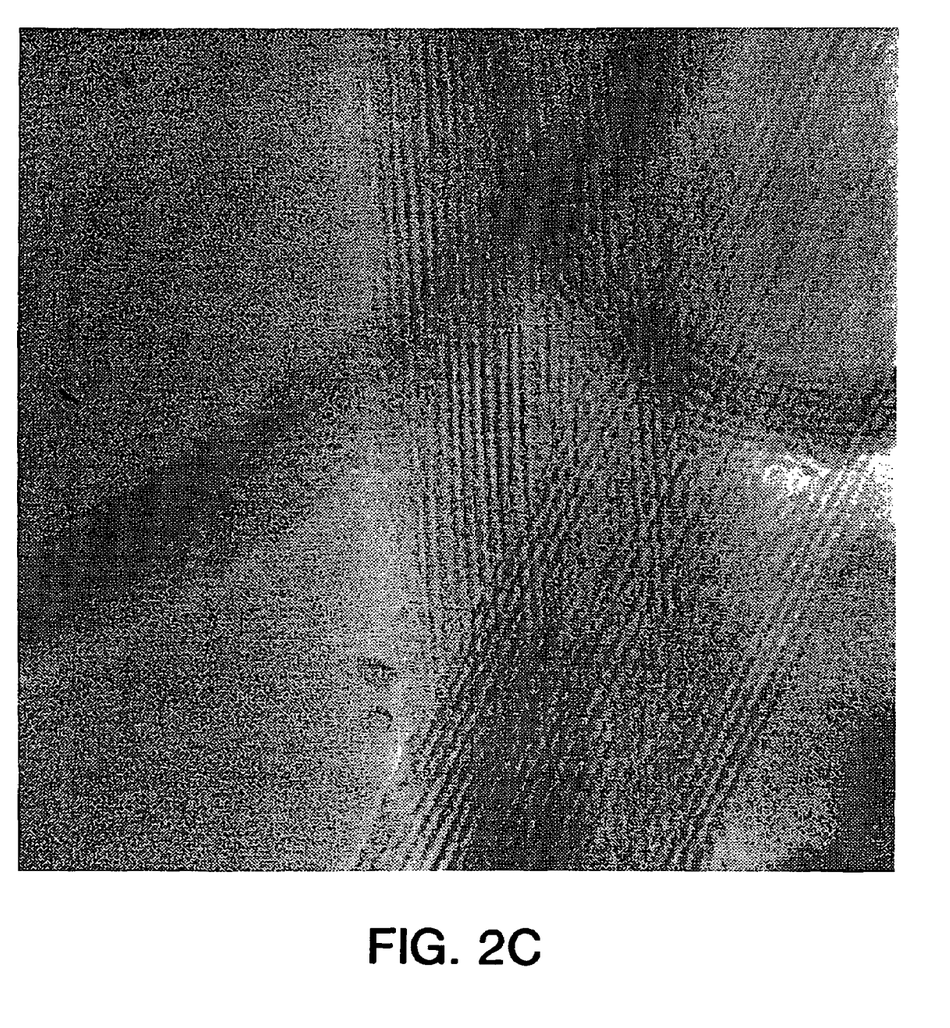
FIG. 2C is a high-magnification image of adjacent single-wall carbon nanotubes.
Figure 2D:
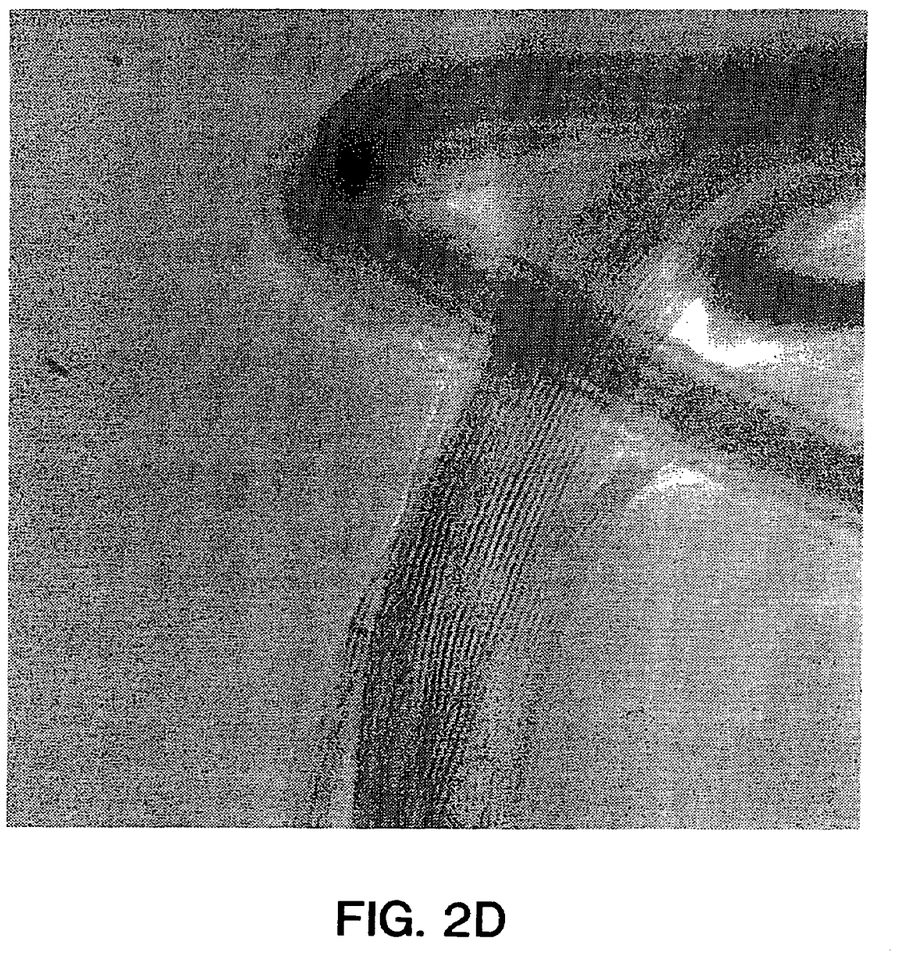
FIG. 2D is a high-magnification image of adjacent single-wall carbon nanotubes.
Figure 2E:
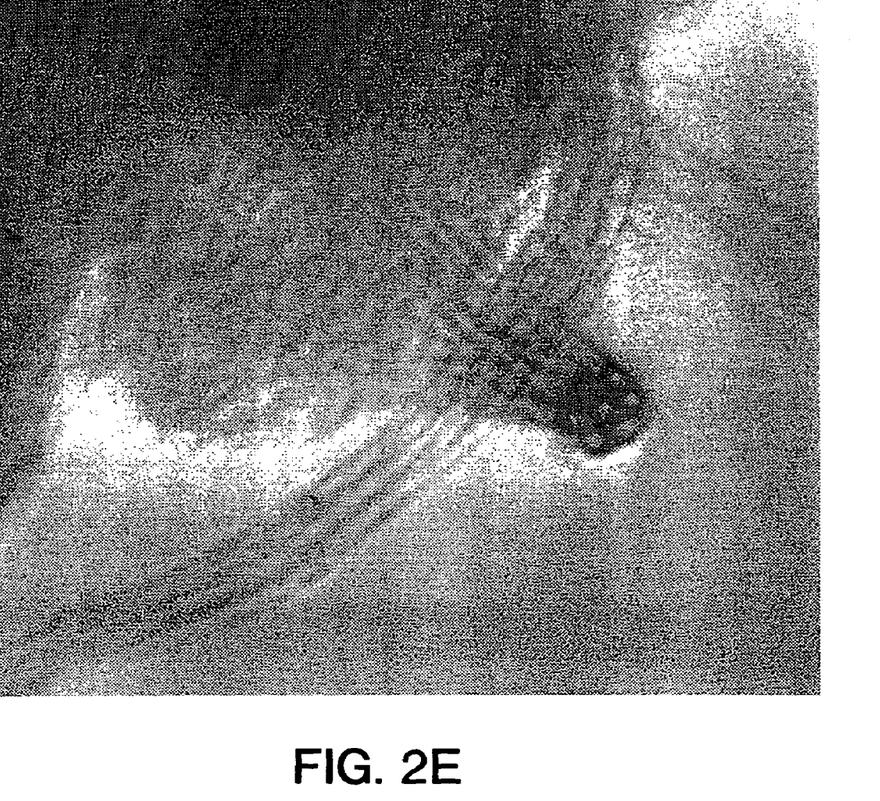
FIG. 2E is a high-magnification image of the cross-section of seven adjacent single-wall carbon nanotubes.

FIG. 2C shows several overlapping bundles of single-wall carbon nanotubes, again showing the generally parallel nature of each single-wall nanotube with other single-wall carbon nanotubes in the same bundle, and showing the overlapping and bending nature of the various bundles of single-wall carbon nanotubes. FIG. 2D shows several different bundles of single-wall carbon nanotubes, all of which are bent at various angles or arcs. One of the bends in the bundles is relatively sharp, illustrating the strength and flexibility of the bundle of single-wall carbon nanotubes. FIG. 2E shows a cross-sectional view of a bundle of 7 single-wall carbon nanotubes, each running roughly parallel to the others. All of the transmission electron micrographs in FIGS. 2A through 2E clearly illustrate the lack of amorphous carbon overcoating that is typically seen in carbon nanotubes and single-wall carbon nanotubes grown in arc-discharge methods. The images in FIGS. 2A through 2E also reveal that the vast majority of the deposit comprises single-wall carbon nanotubes. The yield of single-wall carbon nanotubes is estimated to be about 50% of the carbon vaporized. The remaining 50% consists primarily of fullerenes, multi-layer fullerenes (fullerene onions) and/or amorphous carbon.

FIGS. 2A through 2E show transmission electron microscope images of the products of the cobalt/nickel catalyzed carbon nanotube material that was deposited on the water cooled collector in the laser vaporization apparatus depicted in FIG. 1. Single-wall carbon nanotubes were typically found grouped in bundles in which many tubes ran together roughly parallel in van der Waals contact over most of their length. The grouping resembled an "highway" structure in which the bundles of single-wall carbon nanotubes randomly criss-crossed each other. The images shown in FIGS. 2A through 2E make it likely that a very high density of single-wall carbon nanotubes existed in the gas phase in order to produce so many tubes aligned as shown when landing on the cold water cooled collector. There also appeared to be very little other carbon available to coat the single-wall carbon nanotubes prior to their landing on the water cooled collector in the alignment shown. Evidence that single-wall carbon nanotubes grow in the gas phase, as opposed to for example on the walls of the quartz tube, was provided in earlier work on multi-walled carbon nanotubes using the same method. See Guo et al., "Self-Assembly of Tubular Fullerenes," *J. Phys. Chem.*, Vol. 99, p. 10694 (1995) and Saito et al., "Extrusion of Single-Wall Carbon Nanotubes via Formation of Small Particles Condensed Near An Evaporation Source," *Chem. Phys. Lett.*, Vol. 236, p. 419 (1995). The high yield of single-wall carbon nanotubes in these experiments is especially remarkable because the soluble fullerene yield was found to be about 10 weight percent, and much of the remaining carbon in the soot product consisted of giant fullerenes and multi-layer fullerenes.

EXAMPLE 2

In this example, a laser vaporization apparatus similar to that described by FIG. 1 was used to produce longer single-wall carbon nanotubes. The laser vaporization apparatus was modified to include a tungsten wire strung across the diameter of a quartz tube mounted in an oven. The tungsten wire was placed downstream of the target so that the wire was 1 to 3 cm downstream from the downstream side of the target (13 to 15 cm downstream from the surface of the target being vaporized). Argon at 500 Torr. was passed through the quartz tube at a flow rate equivalent to a linear velocity in the quartz tube of about 1 cm/sec. The oven was maintained at 1200° C. and Group VIII transition metals were combined at 1 to 3 atom % with carbon to make the target.

The pulsed laser was operated as in Example 1 for 10 to 20 minutes. Eventually, a tear drop shaped deposit formed on the tungsten wire, with portions growing to lengths of 3 to 5 mm. The deposit resembled eyelashes growing on the tungsten wire. Examination of the deposit revealed bundles of millions of single-wall carbon nanotubes.

EXAMPLE 3

Graphite rods were prepared as described in Example 1 using graphite, graphite cement and 1.2 atom % of a mixture of 50 atom % cobalt powder and 50 atom % nickel powder. The graphite rods were pressed into shape and then formed into targets as described in Example 1. The graphite rods were then installed as targets in an apparatus as diagramed in FIG. 3, except tungsten wire 32 was not used. A quartz tube holding the graphite rod targets was placed in an oven heated to 1200° C. Argon gas which had been catalytically purified to remove water vapor and oxygen was passed through the quartz tube at a pressure of about 500 Torr and a flow rate of about 50 sccm although flow rates in the range of about 1 to 500 sccm (standard cubic centimeters per minute), preferably 10 to 100 sccm are also useful for a 1 inch diameter flow tube. The first laser was set to deliver a 0.532 micron wavelength pulsed beam at 250 mJ per pulse. The pulse rate was 10 Hz and the pulse duration was 5 to 10 ns. A second laser pulse struck the target 50 ns after the end of the first pulse. The second laser was set to deliver a 1.064 micron wavelength pulsed beam at 300 mJ per pulse. The pulse rate was 10 Hz and the pulse duration was 5 to 10 ns. The first laser was focused to a 5 mm diameter spot on the target and the second laser was focused to a 7 mm diameter gaussian spot having the same center point on the target as the spot from the first laser. About 1/10th of a second after the second laser hit the target, the first and second lasers fired again and this process was repeated until the vaporization step was stopped.

About 30 mg/hr of the raw product from the laser vaporization of the target surface was collected downstream. The raw product comprised a mat of randomly oriented single-wall carbon nanotubes. The raw product mat is made up almost entirely of carbon fibers 10-20 nm in diameter and 10 to 1000 microns long.

About 2 mg of the raw product mat was sonicated in 5 ml methanol for about 0.5 hour at room temperature. Transmission Electron Microscope (TEM) analysis of the sonicated product proved that the product was comprised mostly of ropes of single-wall carbon nanotubes, i.e., bundles of 10 to 1000 single-wall carbon nanotubes aligned with each other (except for occasional branching) having a reasonably constant rope diameter over the entire length of the rope. The ropes were more than 100 microns long and consisting of uniform diameter single-wall carbon nanotubes. About 70 to 90 wt % of the product is in the form of ropes. The individual single-wall carbon nanotubes in the ropes all terminate within 100 nm of each other at the end of the rope. More than 99% of the single-wall carbon nanotubes appear to be continuous and free from carbon lattice defects over all of the length of each rope.

This invention includes the ropes of single-wall carbon nanotubes described herein, particularly in the Examples. Measurements show that the single-wall carbon nanotubes in the ropes have a diameter of 13.8 Å±0.2 Å. A (10, 10) single-wall carbon nanotube has a calculated diameter of about 13.6 Å, and the measurements on the single-wall carbon nanotubes in the ropes proves they are predominantly the (10, 10) tube. The number of single-wall carbon nanotubes in each rope may vary from about 5 to 5000, preferably about 10 to 1000, or 50 to 1000, and most preferably about 100 to 500. The diameters of the ropes range from about 20 to 200 Å, more preferably about 50 to 200 Å. The (10, 10) single-wall carbon nanotube predominates the tubes in the ropes made by this invention. Ropes having greater than 10%, greater than 30%, greater than 50%, greater than 75%, and even greater than 90% (10, 10) single-wall carbon nanotubes have been produced. Ropes having greater than 50% greater than 75% and greater than 90% armchair (n, n) single-wall carbon nanotubes are also made by and are a part of this invention. The single-wall carbon nanotubes in each rope are arranged to form a rope having a 2-D triangular lattice having a lattice constant of about 17 Å. Ropes of 0.1 up to 10, 100 or 1,000 microns in length are made by the invention. The resistivity of a rope made in accordance with this invention was measured to be 0.34 to 1.0 micro ohms per meter at 27° C. proving that the ropes are metallic.

The invention also produces a "felt" of the ropes described above. The product material is collected as a tangled collection of ropes stuck together in a mat referred to herein as a "felt." The felt material collected from the inventive process has enough strength to withstand handling, and it has been measured to be electrically conductive. Felts of 10 mm$^2$, 100 mm$^2$, 1000 mm$^2$ or greater, are formed in the inventive process.

One advantage of the single-wall carbon nanotubes produced with the laser vaporization in an oven method is their cleanliness. Typical discharge arc-produced single-wall carbon nanotubes are covered with a thick layer of amorphous carbon, perhaps limiting their usefulness compared to the clean bundles of single-wall carbon nanotubes produced by the laser vaporization method. Other advantages and features of the invention are apparent from the disclosure. The invention may also be understood by reference to Guo et al., "Catalytic Growth Of Single-Walled Nanotubes By Laser Vaporization," *Chem. Phys. Lett.*, Vol. 243, pp. 49-54 (1995) and the provisional patent applications referenced at the beginning of this disclosure.

The advantages achieved by the dual pulsed lasers insure that the carbon and metal go through the optimum annealing conditions. The dual laser pulse process achieves this by using time to separate the ablation from the further and full vaporization of the ablated material. These same optimum conditions can be achieved by using solar energy to vaporize carbon and metals as described in U.S. application Ser. No. 08/483,045 filed Jun. 7, 1995 which is incorporated herein by reference. Combining any of the Group VIII transition metals in place of the metals disclosed in the Ser. No. 08/483,045 application will produce the single-wall carbon nanotubes and the ropes of this invention.

The invention claimed is:

1. A rope of single-wall carbon nanotubes having 50 to 5000 single-wall carbon nanotubes of which greater than 10% are (10, 10) single-wall carbon nanotubes.

2. A rope of single-wall carbon nanotubes in accordance with claim 1 wherein more than 50% are (10, 10) single-wall carbon nanotubes.

3. A rope of single-wall carbon nanotubes in accordance with claim 2 wherein more than 90% are (10, 10) single-wall carbon nanotubes.

4. A rope of single-wall carbon nanotubes in accordance with claim 3 wherein the rope comprises 100 to 500 single-wall carbon nanotubes.

5. A rope of single-wall carbon nanotubes in accordance with claim 4 wherein the average diameter of all single-wall carbon nanotubes in the rope is 13.8 Å[?]±0.3 Å.

6. A rope of single-wall carbon nanotubes in accordance with claim 4 wherein the average diameter of all single-wall carbon nanotubes in the rope is 13.8 Å[?]±0.2 Å.

7. A rope in accordance with claim 6 wherein the single-wall carbon nanotubes in the rope are in an arrangement wherein a 2-D triangular lattice constant is 17 Å.

8. A rope of single-wall carbon nanotubes in accordance with claim 1 comprising about 100 to about 500 single-wall carbon nanotubes of which greater than 50% are single-wall carbon nanotubes of the armchair form.

9. A rope of single-wall carbon nanotubes in accordance with claim 8 wherein greater than 75% of the single-wall carbon nanotubes of the armchair form.

10. A rope of single-wall carbon nanotubes in accordance with claim 9 wherein greater than 90% of the single-wall carbon nanotubes of the armchair form.

11. A felt, comprising single-wall carbon nanotubes, wherein the single-wall carbon nanotubes comprises ropes of single-wall nanotubes, wherein greater than 10% of the single-wall carbon nanotubes are (10, 10) single-wall carbon nanotubes, and wherein said felt is electrically conductive.

12. The felt of claim 11, wherein the felt comprises about 30-100 wt.% single-wall carbon nanotubes.

13. The felt of claim 11, wherein the size of said felt is 10 mm$^2$, 100 mm$^2$, or 1000 mm$^2$.

14. The felt of claim 11, wherein the size of said felt is at least 10 mm$^2$.

* * * * *